United States Patent
Tong et al.

(10) Patent No.: US 8,582,609 B2
(45) Date of Patent: Nov. 12, 2013

(54) FIBER LASERS WITH DEVICES CAPABLE OF SUPPRESSING HIGH-ORDER MODE MIXING AND GENERATING HIGH QUALITY AND LOW NOISE LASER LIGHT

(75) Inventors: Sha Tong, Mountain View, CA (US); Jerry Prawiharjo, Sunnyvale, CA (US); Anthony Hong Lin, Palo Alto, CA (US)

(73) Assignee: Calmar Optcom, Inc., Sunnyvale, CA (US)

( * ) Notice: Subject to any disclaimer, the term of this patent is extended or adjusted under 35 U.S.C. 154(b) by 125 days.

(21) Appl. No.: 13/403,279

(22) Filed: Feb. 23, 2012

(65) Prior Publication Data

US 2012/0250705 A1     Oct. 4, 2012

Related U.S. Application Data

(63) Continuation-in-part of application No. 13/247,114, filed on Sep. 28, 2011, now Pat. No. 8,532,150.

(60) Provisional application No. 61/516,343, filed on Apr. 1, 2011.

(51) Int. Cl.
*H01S 3/30*     (2006.01)

(52) U.S. Cl.
USPC ............ 372/6; 372/9; 372/30; 372/29.021

(58) Field of Classification Search
USPC .................................... 372/6, 9, 30
See application file for complete search history.

(56) References Cited

U.S. PATENT DOCUMENTS

| 8,353,899 | B1 * | 1/2013 | Wells et al. | 606/10 |
| 2010/0189392 | A1 * | 7/2010 | Rockwell et al. | 385/28 |
| 2011/0249321 | A1 * | 10/2011 | Savage-Leuchs et al. | 359/341.3 |

* cited by examiner

*Primary Examiner* — Dung Nguyen
(74) *Attorney, Agent, or Firm* — SV Patent Service

(57) ABSTRACT

Techniques and devices for generating laser light that use large mode area fiber amplifiers and curved fiber sections to achieve desired operations in a fundamental fiber mode with high pulse quality and optical beam quality while reducing presence of high order fiber modes in continuous wave and pulsed laser devices.

20 Claims, 12 Drawing Sheets

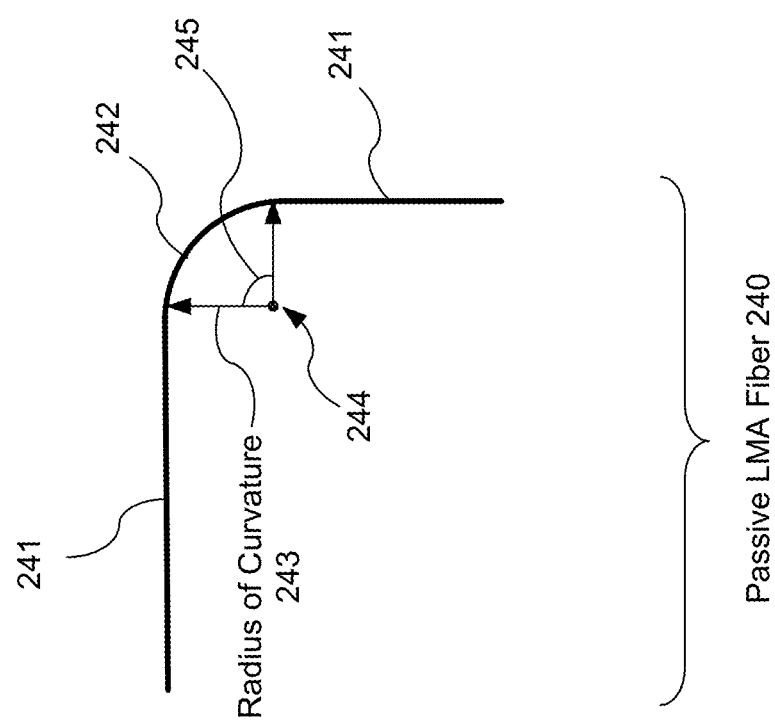

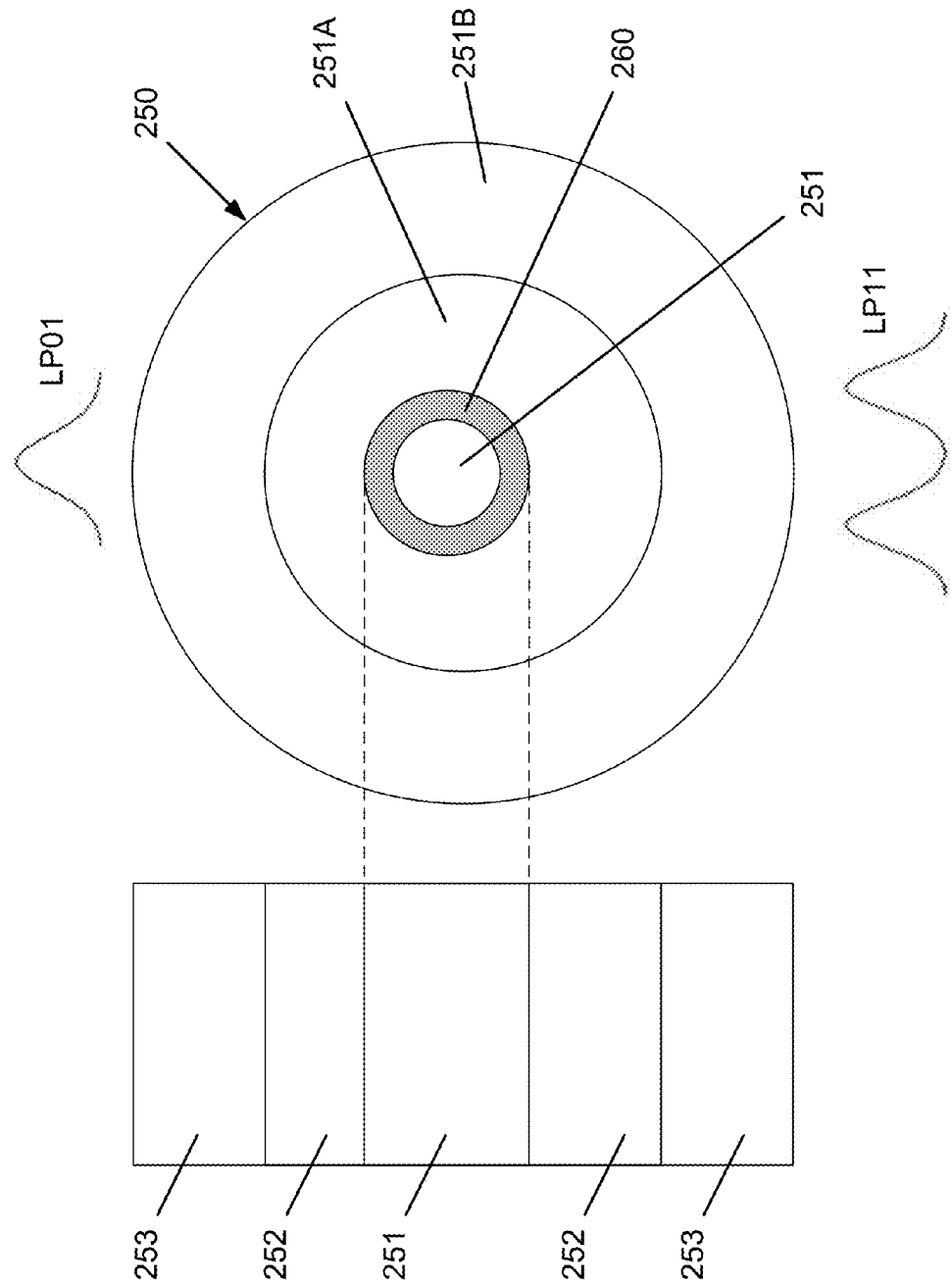

FIBER LASERS WITH DEVICES CAPABLE OF SUPPRESSING HIGH-ORDER MODE MIXING AND GENERATING HIGH QUALITY AND LOW NOISE LASER LIGHT

PRIORITY CLAIM AND RELATED PATENT APPLICATION

This patent document is a continuation-in-part application and claims the priority to U.S. application Ser. No. 13/247,114 "Generating Laser Light of High Beam Quality and High Pulse Quality in Large Mode Area Fiber Amplifiers Based on Suppression of High Optical Modes by Fiber Coiling" filed Sep. 28, 2011 now U.S. Pat. No. 8,532,150 by Sha Tong, Jerry Prawiharjo, and Anthony Hong Lin. U.S. application Ser. No. 13/247,114 claims priority to U.S. Provisional Application No. 61/516,343 entitled "Large Mode Area Fiber Amplifier Design for High Energy Output for Chirp Pulse Amplifier" and filed Apr. 1, 2011 by the same inventors. The disclosures of these applications are incorporated by reference as part of the disclosure of this document.

BACKGROUND OF THE INVENTION

This document relates to generation of laser light by using optical fiber amplifiers in fiber lasers such as pulse fiber lasers and continuous wave fiber lasers.

Fiber amplifiers can be used to amplify continuous wave (CW) and pulsed laser light in a wide range of applications. Pulsed fiber lasers with fiber optical amplifiers have a wide range of applications, including, e.g., optical communications, optical imaging, laser material processing, laser surgery in ophthalmology and surgical procedures, various laser-based biomedical applications, spectroscopic measurements, optical sensing applications, and laser displays. Pulsed fiber lasers can be configured to be compact, reliable and easy to operate and can be further configured to generate laser pulses with various pulse parameters suitable for different applications. For example, pulsed fiber lasers can be configured as ultra short pulsed (USP) lasers with high peak power and pulse duration of around 1 picosecond or less.

SUMMARY OF THE INVENTION

This document describes techniques and devices for generating CW or pulsed laser light having desired primary fiber mode and reduced noises related to high order fiber modes.

In one general aspect, the present invention relates to a fiber laser device for generating laser pulses that includes a pulsed seed laser configured to produce laser pulses; one or more high-order-mode (HOM) mixing suppressors each configured to suppress HOM mixing in the laser pulses; an optical pulse stretcher configured to stretch durations and decrease peak power of the laser pulses; an active large-mode-area fiber configured to amplify the laser pulses to produce amplified laser pulses; and a pulse compressor configured to receive the amplified laser pulses from the active large-mode-area fiber and to shorten the durations and increase the peak power of the amplified laser pulses.

Implementations of the system may include one or more of the following. At least one of the one or more HOM mixing suppressors can suppress HOM mixing to below 5%. At least one of the one or more HOM mixing suppressors can include a passive large-mode-area fiber structured to support a first fundamental fiber mode and first higher order fiber modes, wherein the passive large-mode-area fiber comprises a first curved portion defined by a first radius of curvature not larger than 10 cm, wherein the first curved portion is configured to suppress the mixing of first higher order modes and to allow the laser pulses to transmit through the one or more passive large-mode-area fibers in the first fundamental fiber mode. The first radius of curvature can be 5 cm or smaller. The first curved portion can span an angular range of at least 45 degree. The first curved portion in the passive large-mode-area fiber can be in the form of a circle, a serpentine shape, the shape of the Arabic number "8". The passive large-mode-area fiber can be coiled in one or more circles which includes the first curved portion. The one or more HOM mixing suppressors can include a first passive large-mode-area fiber coupled between the pulsed seed laser and the optical pulse stretcher. The one or more HOM mixing suppressors can include a second passive large-mode-area fiber coupled between the optical pulse stretcher and the active large-mode-area fiber, wherein the active large-mode-area fiber is configured to receive the laser pulses from the second passive large-mode-area fiber. The one or more passive large-mode-area fibers can include a first passive large-mode-area fiber coupled between the optical pulse stretcher and the active large-mode-area fiber, wherein the active large-mode-area fiber is configured to receive the laser pulses from the first passive large-mode-area fiber. The active large-mode-area fiber can be structured to support a second fundamental second fiber mode and second higher order fiber modes, wherein the active large-mode-area fiber comprises a second curved portion that is configured to suppress the mixing of second higher order modes in the active large-mode-area fiber and to allow the amplified laser pulses to transmit through the active large-mode-area fiber in the second fundamental fiber mode. At least one of the one or more HOM mixing suppressors can include a passive large-mode-area fiber which can include a ring-shaped region doped with an absorptive dopant that selectively attenuates HOM in the passive large-mode-area fiber. The fiber laser device can further include a pump laser configured to produce pump light to optically amplify the laser pulses in the active large-mode-area fiber; and a optical combiner coupled with the pump laser and the seed laser, wherein the optical combiner is configured to combine the pump light from the pump laser with the laser pulses from the pulsed seed laser and input into the one or more HOM mixing suppressors.

In another aspect, the present invention relates to a fiber laser device that includes a seed laser configured to produce a continuous-wave (CW) laser beam; a high-order-mode (HOM) mixing suppressor configured to suppress HOM mixing in the CW laser beam; and an active large-mode-area fiber configured to amplify the CW laser beam to produce an amplified CW laser beam.

In another aspect, the present invention relates to a method for suppress HOM mixing in a fiber laser device. The method includes polishing a first end surface of a passive LMA fiber to form a first substantially flat surface oriented less than 0.1 degree relative to a normal plane of an axis of the passive LMA fiber, wherein the passive LMA fiber is configured to perform mode conversion and/or pump delivery to a laser light; polishing a second end surface of an active LMA fiber to form a second substantially flat surface oriented less than 0.1 degree relative to a normal plane of an axis of the active LMA fiber, wherein the passive LMA fiber is configured to amplify the laser light; and fusing the first end surface of the passive LMA fiber and the second end surface of the active LMA fiber to splice the passive LMA fiber and the active LMA fiber, wherein HOM mixing in the laser light is suppressed to below 5% at an interface formed by the first end surface and the second end surface.

In another aspect, a method for generating laser light is provided to include directing laser light first into a passive large mode area fiber that supports a first fundamental fiber mode and first higher order fiber modes and then into an active large mode area fiber that supports a second fundamental fiber mode and second higher order fiber modes and is doped to amplify light to produce amplified laser light. The passive large mode area fiber and the active large mode area fiber are spliced to connect to each other. This method includes coiling the passive large mode area fiber to have a coiling portion that selects light in the first fundamental fiber mode to transmit through the passive large mode area fiber into the active large mode area fiber for amplification while suppressing first higher fiber mode mixing in light output by the passive large mode area fiber; and coiling the active large mode area fiber to have a coiling portion that selects light in the second fundamental fiber mode to transmit through, and to be amplified by, the active large mode area fiber while suppressing the second higher fiber mode mixing in light output by the active large mode area fiber.

In another aspect, a fiber laser device for generating laser pulses is provided to include a pulsed seed laser that produces initial laser pulses; an optical pulse stretcher located downstream from the pulsed seed laser to stretch durations of the initial laser pulses to produce stretched laser pulses that have a reduced peak power relative to the initial laser pulses; and a passive large mode area fiber that supports a first fundamental fiber mode and first higher order fiber modes, and is coupled to receive the stretched laser pulses from the optical pulse stretcher. The passive large mode area fiber is structured to include a coiling portion that selects light in the first fundamental fiber mode to transmit through the passive large mode area fiber while suppressing first higher fiber mode mixing in light output by the passive large mode area fiber. An active large mode area fiber is provided and is spliced to connect to the passive large mode area fiber to receive light output by the passive large mode area. The active large mode area fiber is structured to support a second fundamental second fiber mode and second higher order fiber modes and doped to amplify light to produce amplified laser pulses from the light from the passive large mode area fiber and the active large mode area fiber includes a coiling portion that selects light in the second fundamental fiber mode to transmit through while suppressing the second higher fiber mode mixing in light output by the active large mode area fiber. This device includes a pulse compressor that receives light output by the active large mode area fiber and compresses pulse duration of each laser pulse to produce amplified and compressed output laser pulses with a high peak power.

In yet another aspect, a fiber laser device for generating laser pulses is provided to include a laser that produces initial laser pulses, an optical pulse stretcher located downstream from the pulsed seed laser to stretch durations of the initial laser pulses to produce stretched laser pulses that have a reduced peak power relative to the initial laser pulses, a passive large mode area fiber and an active large mode area fiber. The passive large mode area fiber is structured to primarily support a first fundamental fiber mode while suppressing higher order fiber mode mixing, and includes an input straight fiber portion without significant bending or coiling coupled to receive the stretched laser pulses from the optical pulse stretcher, a coiling portion that is coiled to select light in the first fundamental fiber mode to transmit through the passive large mode area fiber while suppressing higher fiber mode mixing in light output by the passive large mode area fiber, and an output straight fiber portion without significant bending or coiling. The active large mode area fiber is structured to primarily support a second fundamental fiber mode while suppressing higher order fiber mode mixing and is doped to amplify light to produce amplified laser pulses from the light from the passive large mode area fiber, the active large mode area fiber including a straight input fiber portion without significant bending or coiling that is spliced to the output straight fiber portion of the passive large mode area fiber to form a splicing fiber connection that is also straight without significant bending or coiling, a coiling portion that is coiled to select light in the second fundamental fiber mode to transmit through while suppressing light mixing in higher fiber modes in light output by the active large mode area fiber, and an output straight fiber portion without significant bending or coiling. In this device, a pulse compressor is provided and receives light output from the output straight fiber portion of the active large mode area fiber and compresses pulse duration of each laser pulse to produce amplified and compressed output laser pulses with a high peak power.

These and other aspects, their implementations and other features are described in detail in the drawings, the description and the claims.

BRIEF DESCRIPTION OF THE DRAWINGS

FIG. 2A shows an exemplified implementation of the higher-order-modes (HOM) mixing suppressor in FIGS. 1A-1C.

FIGS. 2C-2D shows another exemplified implementation of the HOM mixing suppressor in FIGS. 1A-1C.

FIG. 2D shows an exemplified implementation of a pulsed fiber laser device including a large mode-area (LMA) fiber amplifier design and curved fibers to suppress undesired high order mode mixing.

DETAILED DESCRIPTION OF THE INVENTION

Figure 1A:
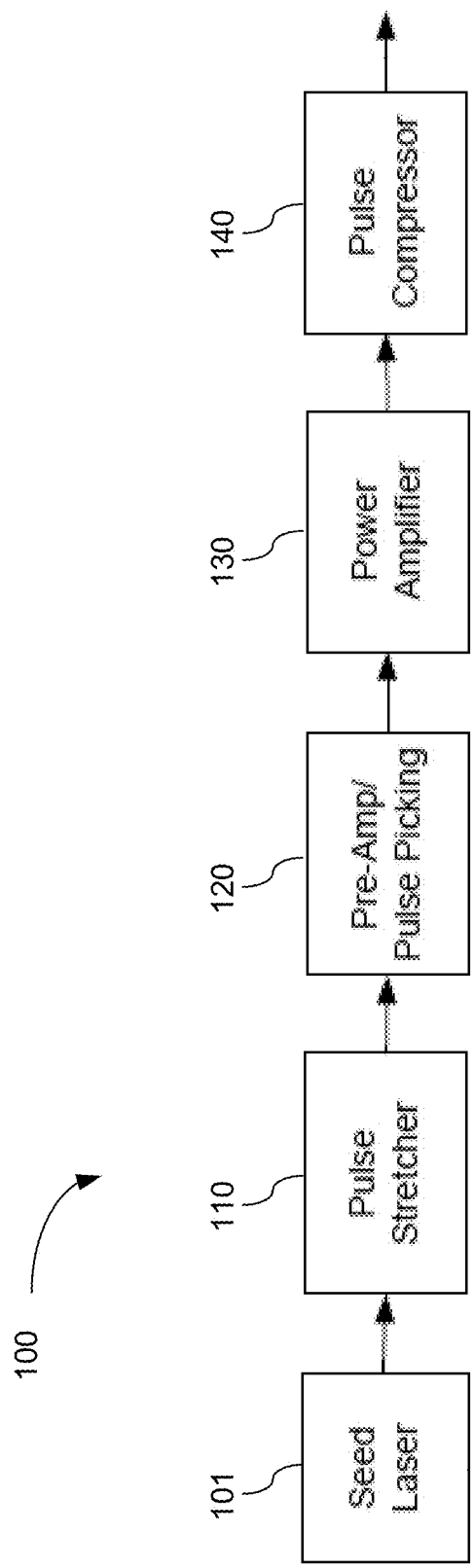
FIG. 1A is a block diagram of an exemplified pulsed fiber laser device compatible with the present invention.

The techniques and devices for generating laser light described in this document use large mode area fiber amplifiers. The large mode area (LMA) fiber amplifiers allow the optical power to be distributed over a relatively large cross section area to reduce the peak optical power in mitigating undesired nonlinear optical effects such as, among others, effects caused by the nonlinear Kerr effect in optical media. However, large mode area fiber amplifiers may support multiple fiber modes and various laser applications desire single mode operations, e.g., fiber lasers producing laser light with optical energy substantially in the fundamental fiber mode while having relatively small or negligible optical energy in higher fiber modes. Coiling fiber sections are provided in the disclosed fiber amplifiers and fiber lasers to force optical energy in the fundamental fiber mode operations while reducing presence of high order fiber modes.

Fiber amplifiers and fiber lasers in continuous wave (CW) and pulsed laser devices use optical fiber to confine pump light and generate amplified laser light. The amplified laser light, such as laser pulses, tend to have high optical peak power which may reach sufficiently high levels that cause undesired optical nonlinear effects in fiber and may even damage the fiber such as the doped fiber section and other optical elements. One parameter for characterizing the nonlinear optical properties is the B integral:

$$B = \frac{2\pi}{\lambda} \int n_2 I(z) dz \qquad \text{eqn. (1)}$$

where I(z) is the optical intensity at position z along the propagation direction of the beam, and $n_2$ the second-order nonlinear refractive index caused by the Kerr effect. The B integral represents the total on-axis nonlinear phase shift accumulated in a passage through the device. The designs of coiling fiber sections in fiber amplifiers described in this application can suppress the optical energy in higher fiber modes in fiber amplifiers with large B integral values. The disclosed designs can also suppress the optical energy scattering to the side of a main optical pulse due to large B integral values in a chirped pulse amplification system as well as mixing of high order fiber modes into the fundamental fiber mode.

The described combination of using large mode area fiber amplifiers and designed coiling fiber sections in such fiber amplifiers can be used in both CW and pulsed fiber amplifiers and fiber lasers. The examples provided below are for pulsed fiber amplifiers and pulsed fiber lasers, including devices based on chirped pulse amplification (CPA) designs. CPA devices use a seed laser to produce seed laser pulses, a pulse stretcher that temporally stretches the pulse duration of the seed pulses to reduce the pulse peak power, one or more optical fiber amplifiers that amplify the pulse energy of the stretched laser pulses and a pulse compressor that recompresses the amplified and stretched laser pulses into high power laser pulses with desired short pulse durations.

FIG. 1A shows an exemplified pulsed fiber laser device 100 based on a CPA design. The pulsed fiber laser device 100 includes a seed pulsed laser 101 that generates seed laser pulses having a seed pulse duration. Downstream an optical pulse stretcher 110 receives the seed laser pulses and can modify the seed laser pulses to produce modified laser pulses that have pulse duration greater than the seed pulse duration. A module 120 can be provided to include a pre optical amplifier that receives and amplifies the modified laser pulses from the optical stretcher 110 and a pulse picking function to reduce the original pulse repetition rate in the seed laser pulses. The main optical amplifier in the pulsed fiber laser device 100 is the optical amplifier 130 which may include one or more fiber amplifiers. The output optical pulses of the main fiber amplifier 130 are directed into a pulse compressor 140 to compress the pulse duration to a desirable short pulse duration for the output laser pulses. The fiber optic geometry of the pulsed fiber laser device 100 and other fiber laser devices tends to be inherently robust, compact, and can be directly pumped by low cost semi-conductor lasers. Laser light in the fiber is confined to a much small area and propagates over a long section of fiber resulting in nonlinear interactions between electric field and fiber glass medium, thus causing unwanted pulse distortions. Large-mode-area (LMA) double-clad fibers are used to provide an effective area that can be orders of magnitude larger than single-mode-fibers (SMFs). Commercially available LMA fibers typically have core sizes of up to 30 microns, and are engineered to have low numerical aperture (NA) for reducing the number of fibers modes. For example, the fundamental fiber mode for a fiber can be the LP01 mode and a higher order fiber mode can be the LP11 mode.

Figure 1B:
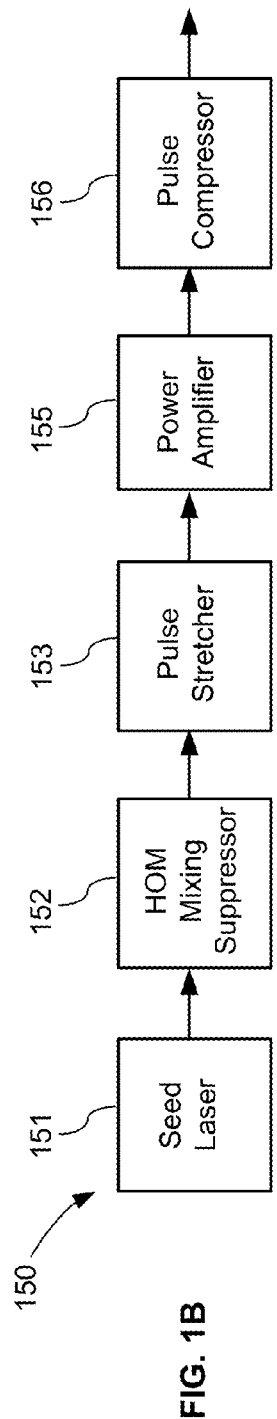
FIGS. 1B-1D are block diagrams of different implementations of high-quality, low noise pulsed fiber laser device in accordance with the present invention.
Figure 1C:
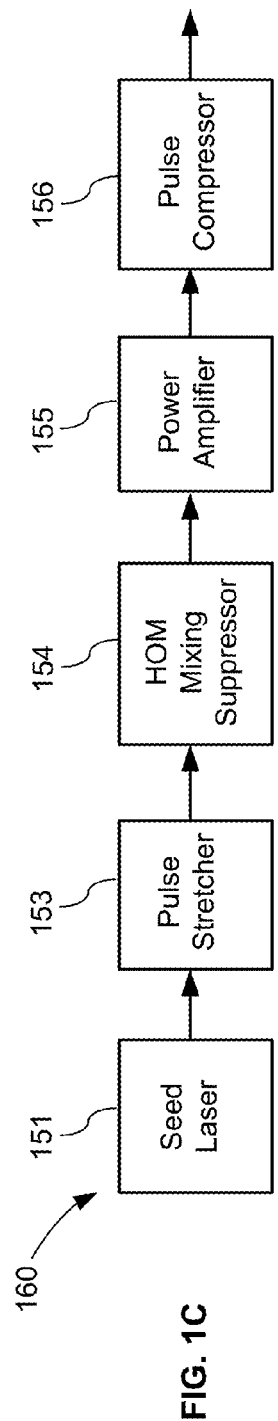
Figure 1D:
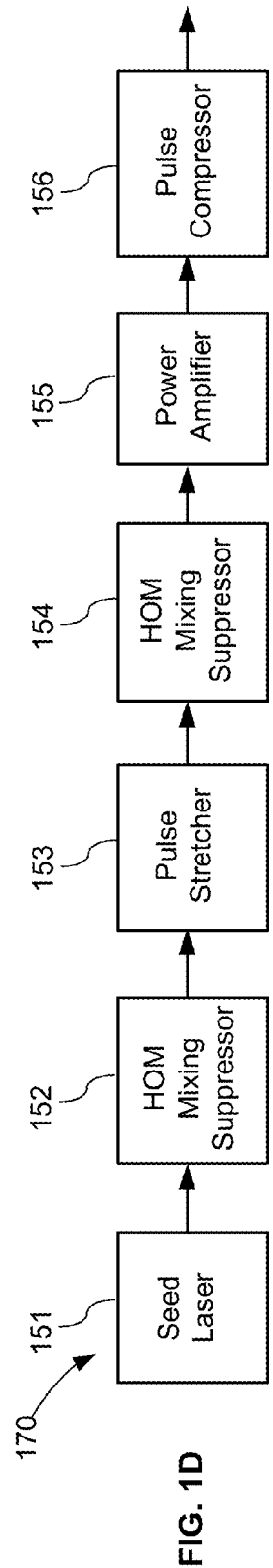
Figure 1E:
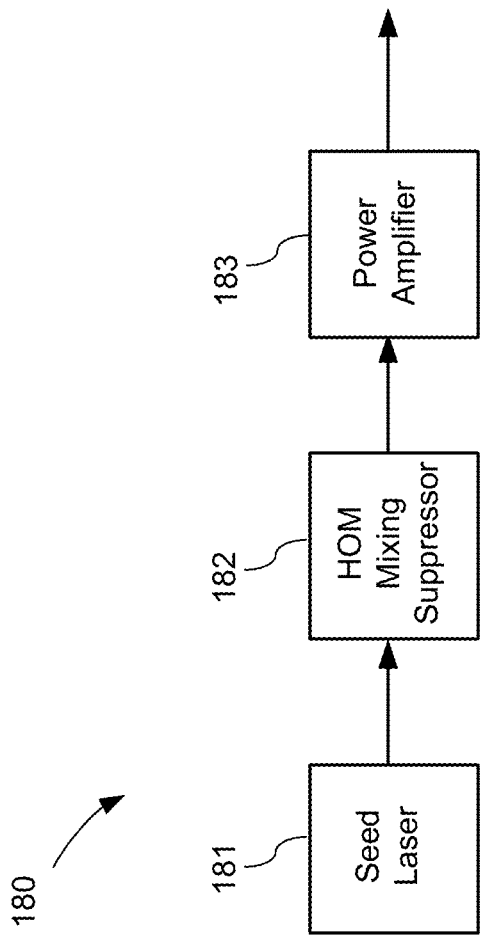
FIG. 1E is a block diagram of a continuous wave fiber laser device in accordance with the present invention.

FIGS. 1B-1D show different implementations of high-quality, low noise pulsed fiber laser device in accordance with the present invention. Each of the pulsed fiber laser devices 150, 160, 170 include a seed laser 151, a pulse stretcher 153, a power amplifier 155, and a pulse compressor 156, which perform functions of the seed laser 101, the pulse stretcher 110, the amplifier 130, and the pulse compressor 140, as described above in relation to FIG. 1A. In addition, a HOM mixing suppressor 152 is positioned between the seed laser 151 and the pulse stretcher 153 in the pulsed fiber laser devices 150, 170. A HOM mixing suppressor 154 is positioned between the pulse stretcher 153 and the amplifier 155 in the pulsed fiber laser devices 160, 170. As described in more details by the examples below, the HOM mixing suppressor 152 can suppress the HOM mixing in the pulsed laser light received from the seed laser 151. The HOM mixing suppressor 154 can reduce and prevent HOM mixing in the pulsed laser light before it is being amplified by the power amplifier 155. [0001] In some embodiments, referring to FIG. 1E, a continuous wave fiber laser device 180 includes a seed laser 181 configured to emit a continuous laser beam, a HOM mixing suppressor 182, and a power amplifier 183 configured to amplify the continuous laser beam. The HOM mixing suppressor 182 is configured to suppress HOM mixing in the laser beam before it is amplified by the power amplifier 183.

The HOM mixing suppressors 152, 154, 182 (FIG. 1B-1E) can be implemented by different components and different techniques. In one implementation, referring to FIG. 2A, the HOM mixing suppressors 152, 154, 182 (FIG. 1B-1E) can be implemented by a passive large mode-area (LMA) fiber 240 that includes one or more substantially straight portions 241 and one or more curved portions 242. One of the straight portions 241 can couple pulsed or continuous laser light into the passive LMA fiber 240. The passive LMA fiber 240 is not doped and essentially does not amplify the laser light transmitting there through. The curved portion 242 is structured to suppress HOM mixing of the pulsed or continuous laser light propagating through the passive LMA fiber 240. In some implementations, the curved portion 242 can be defined by a radius of curvature 243 from a center 244, and an angular span 245. In some implementations, the radius of curvature 243 is smaller than 10 cm. In some implementations, the radius of curvature 243 is smaller than 5 cm. The angular span can for example be 45 degrees, 90 degrees, 180 degrees, or 360 degrees or more. In some implementations, as shown in FIG. 2D below, the curved portion 242 can include one or more wound or coiled passive LMA fiber. In experiments, it is found that the curved portion 242 can suppress the HOM to below 5%, or below 1%, in the passive LMA fiber 240 while substantially not affecting the fundamental fiber mode. One of the straight portions 241 can guide the pulsed or continuous laser light in its fundamental fiber mode out of the passive LMA fiber 240.

Figure 2B:
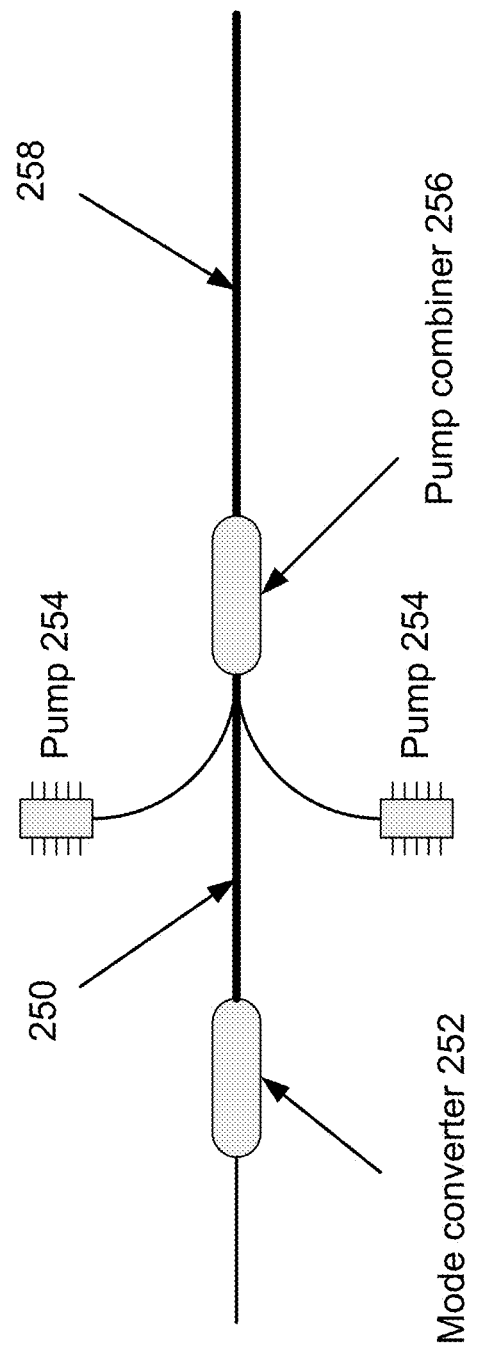
FIG. 2B shows another exemplified implementation of the HOM mixing suppressor in FIGS. 1A-1C.
Figure 2D:
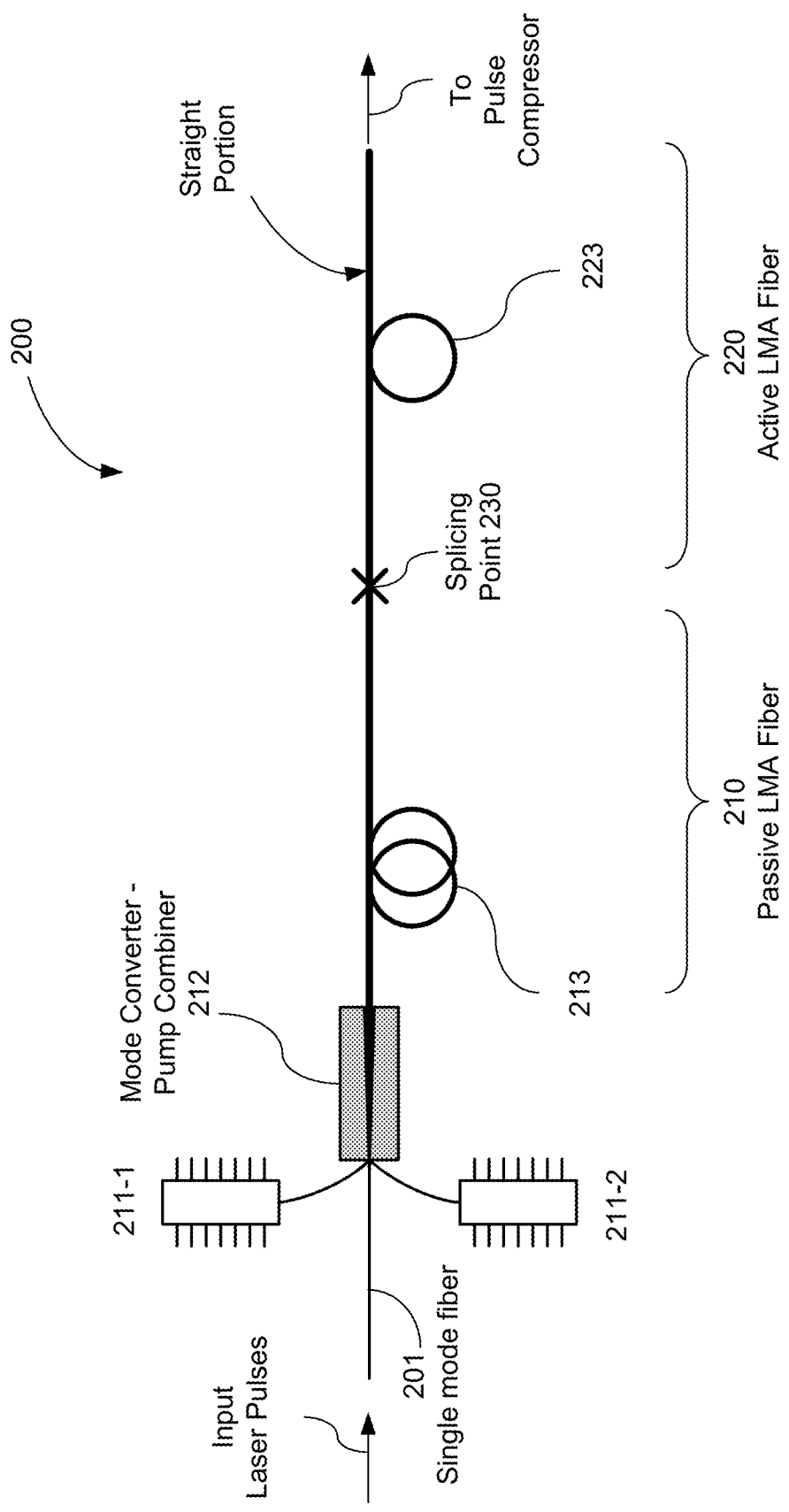

In some embodiments, referring to FIGS. 2B-2C, the HOM mixing suppressors 152, 154, 182 (FIG. 1B-1E) can be implemented by a passive LMA fiber 250 that suppresses HOM. FIG. 2B shows a portion of a fiber laser device in accordance to the present invention. The passive LMA fiber 250 is coupled between a model converter 252 and a pump combiner 254. The pump combiner 254 is connected to one or more pumps 254 and a power amplifier 258 which can be implemented by a Yd doped LMA fiber 258.

FIG. 2C shows, on the left, a cross-sectional view of the passive LMA fiber 250 along the axial direction, and on the right, a cross-sectional view of the passive LMA fiber 250 across the axial direction. The passive LMA fiber 250 is composed of a core 251, an inner cladding 251A, and an outer cladding 251B. The core 251 is selectively doped by an absorptive dopant in a ring-shaped region 260 concentric to the core 251, the inner cladding 251A, and the outer cladding 251B. Examples of suitable dopants include Yb ions. The diameter of the ring shaped region 260 is selected to discriminately attenuate the HOM such as the LP11 mode (shown below the cross-sectional view of the passive LMA fiber 250 across the axial direction). The effective diameter can be selected slightly larger than the mode-field-diameter of the fundamental mode to minimize attenuation of the fundamental mode (LP01 shown above the cross-sectional view of the passive LMA fiber 250 across the axial direction). The effective length of the passive LMA fiber 250 should satisfy the relation:

$$L = SPR/(\text{Loss\_HOM} - \text{Loss\_01}) \qquad \text{eqn. (2)}$$

wherein the attenuation of the fundamental mode per unit (m) length is Loss_01, the attenuation of HOM per unit fiber length is Loss_HOM, and SPR is the required suppression ratio. The disclosed passive LMA fiber 250 can be applied to pulse fiber laser device or CW laser device.

FIG. 2D shows an example of a pulsed fiber laser device 200 that can be used as the fiber amplifier 130 in FIG. 1A. The pulsed fiber laser device 200 uses a double clad LMA fiber amplifier. Such a large mode-area fiber amplifier can produce higher output power with lower nonlinear effects than some fiber amplifiers and thus can be advantageous. The pulsed fiber laser device 200 includes a passive LMA fiber part 210 that provides the pump light and an active LMA fiber part 220 that includes the doped LMA fiber gain medium to receive the pump light from the passive LMA fiber part 210 and to produce the optical gain that amplifies the input laser pulses. The passive and active LMA fiber parts 210 and 220 are spliced at a splicing point or connection 230 to connect to each other. The passive and active LMA fiber parts 210 and 220 are kept in straight configurations near the splicing point 230. A single mode fiber 201 is coupled to the passive LMA fiber part 210 and used as an input fiber to direct input laser pulses into the pulsed fiber laser device 200.

The passive LMA fiber 210 has an input coupled to a mode converter-pump combiner 212 that combines the pump light from one or more pump laser diodes (e.g., two pump laser diodes 211-1 and 211-2) and the input laser pulses into a passive LMA fiber that is coupled to the combiner 212. The combiner 212 may be implemented as a fused mode converter to adiabatically convert the fundamental mode in SMF into the fundamental mode in the passive LMA fiber 210. This passive LMA fiber 210 is not doped with gain ions and thus is a passive optical fiber. The passive LMA fiber can be configured in a double clad configuration to receive pump light from two lower brightness pump diodes 211-1 and 211-2 for a desired optical pumping level at a reduced cost.

The passive LMA fiber 210 includes an input straight fiber portion without significant bending that is coupled to the combiner 212 to receive the input laser pulses, a coiling portion 213 that is coiled to select light in the fundamental fiber mode to transmit through the passive LMA fiber 210 while suppressing HOM mixing in light output by the passive LMA fiber 210, and an output straight fiber portion without significant bending that is connected to the active LMA fiber 220 at the splicing location 230. With the above design, the passive LMA fiber 210 is structured to primarily support its fundamental fiber mode and to suppress undesired HOM mixing. This coiling in the passive LMA fiber 210 provides a pre-amplification control of the fiber modes before optical amplification in the active LMA fiber 220. As such, HOM mixing is suppressed in the input light to the active LMA fiber 220.

The active LMA fiber 220 is structured to primarily support its fundamental fiber mode while suppressing undesired HOM mixing. The active LMA fiber 220 and is doped with suitable ions to amplify light to produce amplified laser pulses. The active LMA fiber 220 includes a straight input fiber portion without significant bending or coiling and this portion is spliced to the output straight fiber portion of the passive LMA fiber 210 at the splicing fiber location or connection 230, and a coiling portion 223 that is coiled to select light in the fundamental fiber mode to transmit through it while suppressing HOM mixing. An output fiber portion of the active LMA fiber 220 is a straight fiber portion without significant bending and directs the laser pulses out of the active LMA fiber 220 as the output light, e.g., the output to the pulse compressor 140 in FIG. 1A.

Proper coiling causes high order modes to experience higher optical loss than that of the fundamental fiber mode and thus effectively produces an optical filtering of the high order modes in the coiled fiber section. Notably, outside the coiling sections 213 and 223, other sections of the passive and active LMA fibers 210 and 220 are kept straight without significant bending or coiling to reduce undesired optical coupling between different fiber modes. At the splicing location 230, in addition to reduce undesired coupling of different fiber modes by keeping the fibers at and around splicing location 230 straight, the straight profile also creates a proper mode matching between the fundamental mode of the passive LMA fiber 210 and the fundamental mode of the active LMA fiber 220 so that the light energy in the fundamental mode of the passive LMA fiber 210 can be coupled into the fundamental mode of the active LMA fiber 220 at a high coupling efficiency. The coiling sections 213 and 223 are designed to have a coiling diameter around an optimal coiling diameter around which light energy in the fundamental fiber mode (e.g., LP01) remains in the fundamental fiber mode without significant coupling to higher fiber modes (e.g., the lowest higher order mode is LP11). When the coiling diameter is significantly greater than the optimal coiling diameter, light energy in the higher fiber mode is not significantly attenuated. When the coiling diameter is significantly less than the optimal coiling diameter, light energy in the fundamental fiber mode is significantly attenuated and mode-mixing between the fundamental mode and higher order mode is large. Therefore, the optimal coiling diameter represents an optimal coiling diameter. Proper coiling can be controlled by the coiling diameter and other parameters, such as the number of turns of the coiling section and the location of the coiling section from the splicing location 230. Some details on coiling are provided in examples below.

Various LMA fibers, such as commercial LMA fibers, have a large, low numerical aperture core that supports a few modes. The existence of higher-order-modes (HOMs) has negative impacts on both spatial beam quality and temporal pulse quality for the amplification of the laser pulses in the pulsed fiber laser device 200. To the first degree of approximation, the beam quality of a LMA fiber is directly proportional to the content of HOMs present in the fiber. The active fiber with the fiber gain medium amplifies both the fundamental mode and HOMs and this amplification exacerbates the undesired effects caused by the presence of the HOMs. Coiling of the active LMA fiber in fiber amplifiers and lasers can reduce the undesired energy coupling to the higher fiber modes in the active LMA fiber but the coiling in the active LMA alone turns out to be insufficient as shown in experimental tests. It was found that additional curving or coiling of the passive LMA fiber on the input side of the active LMA fiber is needed to reduce or move undesired higher fiber modes before the light enters the active LMA fiber for amplification.

The effect of HOMs on pulse quality for fiber-based amplifiers such as CPA systems is complicated. In an ideal multimode fiber, the fundamental mode could propagate without being scattered into HOMs. However, in reality, imperfections in the fiber core can provide coupling mechanisms between the fundamental fiber mode and higher fiber modes and such coupling can generate a delayed replica as a side pulse with respect to the main pulse. This delayed replica or side pulse can interfere with the main pulse and this interference can create undesired intensity and temporal phase modulations. To a certain extent, the modulations effectively serve as a phase grating and transfer the pulse energy from main pulse to side pulses. Our investigation suggests that the lower the initial pulse-contrast between the main pulse and the side pulse prior to the amplification and the higher the B-integral of the LMA amplifier, the higher the efficiency of the energy transfer from the main pulse to the one or more side pulses. The other effect of fiber imperfection is a fusion splice point which can introduce significant mode mixing of higher order fiber mode with fundamental fiber mode. Fiber fusion splice is a useful technique to join fibers together reliably, but the non-vertical cleave, core misalignment, and mode-field diameter mismatch can undesirably cause imperfection at the fusion splice point.

Figure 3B:
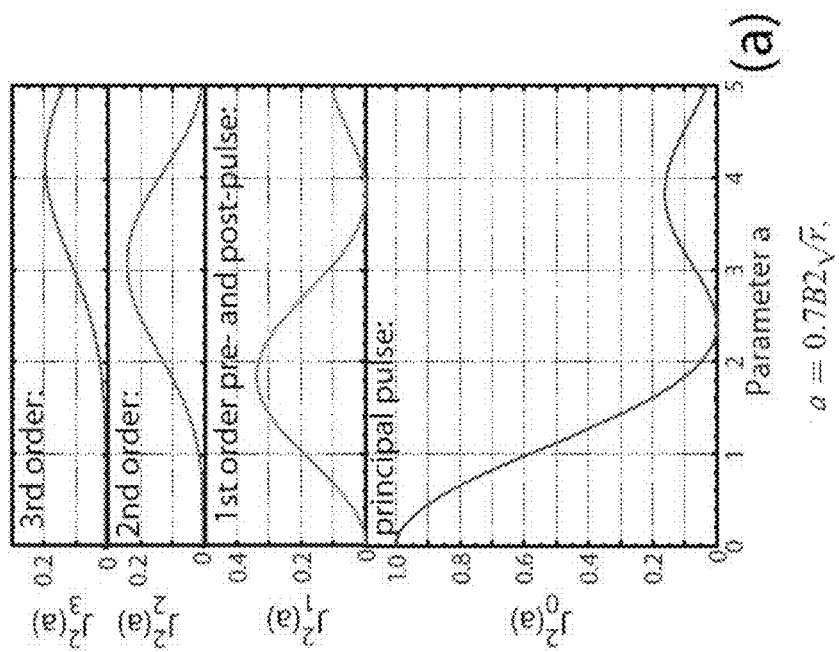
FIGS. 3A and 3B illustrate pulse quality degradation as a consequence of mode coupling in fiber device without fiber curving to suppress undesired high order mode mixing.
Figure 3A:
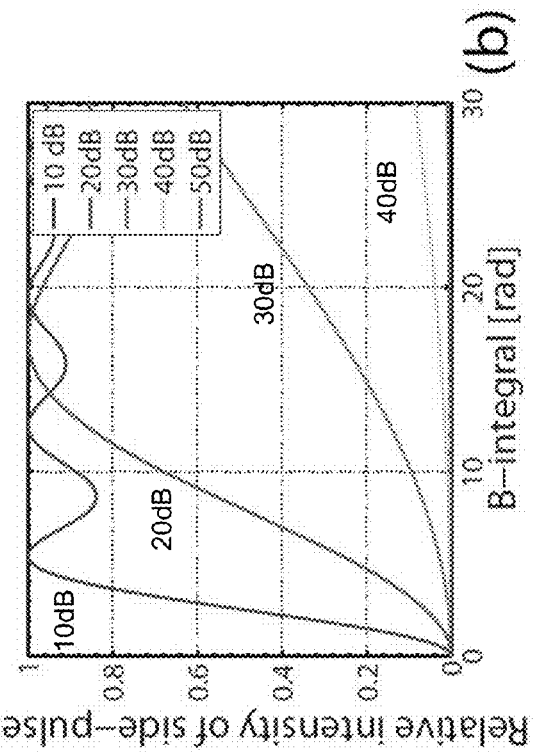

FIGS. 3A and 3B show simulations of properties of the main and side pulses generated in a CPA system in absence of the coiling design in FIG. 2D. FIG. 3A shows relative intensities of the main and side pulses as a function of the parameter as defined and FIG. 3B shows the total intensity variations as a function of the B integral for the main and side pulses. The total intensity in the final side pulses relative to the intensity of the main pulse can be estimated by $$1 - J_0^2(0.7B2\sqrt{r}), \qquad \text{eqn. (3)}$$

where $J_0$ is the zero-order Bessel function, B is the B-integral value and r is initial pulse contrast. The simulations are based on an initial pulse contrast of r=20 dB, a B-integral of $3\pi(\sim10)$ rad and the final compressed pulse has approximately 60% of energy in the side pulse. Assuming that the mode-coupling for various parts of a LMA fiber amplifier is typically 20 dB or higher, such as the fused-mode-converter pump-combiner 212, fusion-splice splicing point 230, and several meters long of the LMA gain fiber 220 as shown in FIG. 2D. In absence of implementing the coiling-based HOM mixing suppression shown in FIG. 2D, the magnitude of the side pulse energy in this exemplary CPA would be significant for a large B-integral (e.g., a value greater than it rad). In addition, the existence of HOMs alone significantly degrades the pulse quality by generating multiple pulses at the exit of the fiber due to the intermodal dispersion.

This formula calculates the amplification (or degradation) of pulse contrast due to B-integral. Table I below shows B integral amplification effects on final pulse contrast due to initial pulse contrast. The acceptable output pulse contrast is set as not more than 10%. The required input pulse contrast ratio is then calculated as 10% divided by the amplification factor. The pulse contrast ratio in dB is calculated as −10 log (contrast in percent).

TABLE I

B integral amplification effects on final pulse contrast due to initial pulse contrast

| B-integral value | | 1 | 3 | 5 | 7 | 10 | 20 |
|---|---|---|---|---|---|---|---|
| Amplification of Pulse contrast | (times) | 1.0 | 8.8 | 24.5 | 48.0 | 98.0 | 391.4 |
| | dB | 0 | 9 | 14 | 17 | 20 | 26 |
| Required initial pulse contrast for 10% output contrast | Percent | 10% | 1.1% | 0.41% | 0.21% | 0.10% | 0.026% |
| | dB | 10 | 19 | 24 | 27 | 30 | 36 |

Therefore, the existence of HOMs imposes serious challenges to the design and construction of fiber-based CPA system in the tens of micro Joule energy level. For example, in order to obtain a pulse with a contrast ratio of better than 13 dB, the HOM mixing needs to be suppressed to below than 30 dB upon launching into the active LMA fiber, assuming a 1% mode coupling coefficient and a B-integral of up to $3\pi$. For many CW or long pulse fiber laser or amplifier applications, designs and testing of LMA amplifiers by others tend to ignore any HOM content that is less than 20 dB, which is understood as limiting the LMA amplifier tolerance to B-integral of around $\pi(\sim3)$ rad. Furthermore, for many CW or long pulse fiber laser applications, HOM content in the passive LMA fiber part is not significant due to coiling of the active LMA fiber. As a result, component vendors usually suggest their customers not to coil the passive LMA fiber. Such designs fail to recognize the undesired degradation to the laser light caused by presence of seemingly relatively small or perceived to be insignificant HOMs in the input to the active LMA fiber. The coiling design in both the passive LMB fiber and the downstream active LMB fiber illustrated in the example of FIG. 2D can be used to effectively mitigate the degradation to the fundamental mode pulses and achieve high quality mode beam. For example, a high suppression of energy loss to undesired side pulses (e.g., at or greater than 30 dB) at the input of the LMA amplifier and during the amplification can be achieved by the design in FIG. 2D and this can lead to a tolerance of the B-integral of more than a factor of three or higher in some implementations.

Referring back to FIG. 2D, the fiber coiling or fiber curving is implemented in both the passive and active LMA fibers 210 and 220 to suppress the HOM mixing in the laser light. The coiling or curving in the active and passive LMA fibers 210 and 220 can be controlled to be at an optimal coiling diameter.

For example, the optimal coiling diameter is 6 cm for the types of LMA fibers used in the experimental tests as shown in FIG. 2D. In most implementations, the optical curving radius is smaller than 10 cm. In design, one or more the following coiling parameters can be used to create a desired coiling condition: (1) coiling diameters in the passive and active LMA fibers, respectively, where two LMA fibers may have different coiling diameters; (2) the number of coils in each of the passive and active LMA fibers, where the coil numbers of the passive and active LMA fibers can be different; (3) orientations of different coils in a coil section, e.g., two adjacent coils in a coil section can be perpendicular to each other (i.e., planes in which the two adjacent coils are in are perpendicular to each other) to balance the stresses induced by coiling in the coil section; (4) the coiling location of each coil section, (5) LMA fiber mode-coupling control, or (6) low-mode-coupling optical component selection.

For a CW laser with higher output power, using LMA fiber reduces the detrimental nonlinear Brillouin effect, which reflects narrow line width CW laser in the counter propagating direction. However, the LMA support both fundamental mode and higher order modes (HOM). The light experiences different phase delays when propagating in the fundamental mode and higher order modes. When the higher order mode mixes into the fundamental mode, it causes the disturbance in the optical phase of a CW laser light. As a result, the output laser light pass through a LMA fiber can experience line width broadening or noise increase. The HOM mixing suppression mentioned here, is a useful tool to reduce CW laser noise from a LMA fiber amplifier.

In the example in FIG. 2D, the fiber curving diameter was set at 6 cm and tests indicates that the fiber-curving-induced high loss for the HOMs was effectively and hardly any loss for the fundamental mode was measured at the output. The beam parameter product is the product of the half of the divergence angle of a beam and the radius of the beam at the beam waist. The ratio of the beam parameter product to that of an ideal Gaussian beam at the same wavelength is denoted $M^2$ and is used to characterize the beam quality. Tests conducted for the prototype devices based on FIG. 2D suggested that the beam quality parameter, $M^2$, decreases monotonically with the decrease in fiber curving diameter. The LMA fiber generated near-diffraction-limited beam ($M^2<1.05$) at the fiber curving diameter of 6 cm. Tests also indicated that further reducing the fiber curving diameter from 6 cm actually degrades the beam quality.

The fiber curving in the passive LMA fiber 210 upstream from the active LMA fiber 220 in FIG. 2D cleans up the beam mode quality before the splicing at the splicing location 230. This pre-splicing beam cleanup based on proper fiber curving in the passive LMA fiber 210 is beneficial to establishing single mode excitation into the active LMA fiber. The measured values of $M^2$ in conducted tests were up to 1.3 from the fused-mode-converter pump-combiner without fiber curving the passive LMA fiber. The beam quality can be improved to an $M^2$ of less than 1.1 after properly fiber curving the fiber. Fiber curving the active fiber further reduces the HOMs that are commonly excited at splicing point, even if the input to the active LMA fiber is the single mode input from the passive LMA fiber. Our measurements indicated that the common fusion splicing usually degrades beam quality by a factor of 10% despite careful optimization of the splicing process.

In our tests of the design in FIG. 2D, two coils were formed in the passive LMA fiber in order to completely substantially eliminate the existence of HOMs. Our tests indicated $M^2$ decreases monotonically with the numbers of coils. The LMA fiber generated near diffraction limited beam ($M^2<1.05$) after two coils with a fiber curving diameter of 6 cm. In our tests, only one coil was formed in the active LMA fiber because additional curving-induced stress caused by additional curving the active LMA fiber could increase the possibility of undesired mode-coupling between HOMs and fundamental mode. The selection of a single coil in the active fiber was the result of trade-off between spatial filtering and mode coupling.

In conducted tests for the design in FIG. 2D, care was taken during fiber curving to avoid inducing significant torsional stress to fiber because torsional stress can induce undesired coupling between different fiber modes.

Our tests indicated that the fiber curving positions should be located at proper locations to achieve effective suppression of HOM mixing. Curving the passive fiber at a location too close to the splicing point 230 can induce unwanted stress in the fiber and in the splicing point 230 and this induced stress can degrade the splicing quality. Curving in the passive fiber at a location too far from the splicing point 230 leaves excessive length of fiber between coil 213 and the splicing point 230 that may lead to additional coupling to the HOMs after the HOM cleaning by the coil 213 and thus may fail to achieve cleaning the HOMs in the laser light when reaching the splicing point 230. Curving the active fiber at a location too far away from the splicing point 230 would allow additional mode coupling between HOMs and the fundamental mode before light reaches the coil 223 and curving the active fiber at a location too close to the splicing point 230 may induced undesired stress to the splicing point. In our tests, curving positions on both active and passive fibers were chosen about 5 cm on either way of the splicing point.

Various techniques can be used to provide effective LMA fiber mode-coupling control. In some implementations in controlling the mode-coupling between HOMs and the fundamental mode in the active fiber, one or more of the following can be used: (1) Using a very short gain fiber that is highly doped to reduce the fiber length and accordingly the possibility of undesired mode coupling (prototype devices based on FIG. 2D used a LMA gain fiber length of approximately 1 m); (2) keeping the spliced section straight to avoid any additional stress; (3) keeping the LMA gain fiber as straight as possible (e.g., fixing whole LMA gain fiber on a flat sheet of metal instead of wrapping around a cylindrical mandrel); (4) isolating the LMA gain fiber from turbulence air flow sources such as cooling fan; and (5) avoiding exposing the active LMA fiber to stress and high temperature.

In constructing the devices in FIGS. 1 and 2, components with low mode-coupling can be selected, e.g., active fiber with intrinsic low coupling between HOMs to the fundamental mode and robust against external disturbance, and good quality fused-mode-converter pump-combiner.

Figure 4:
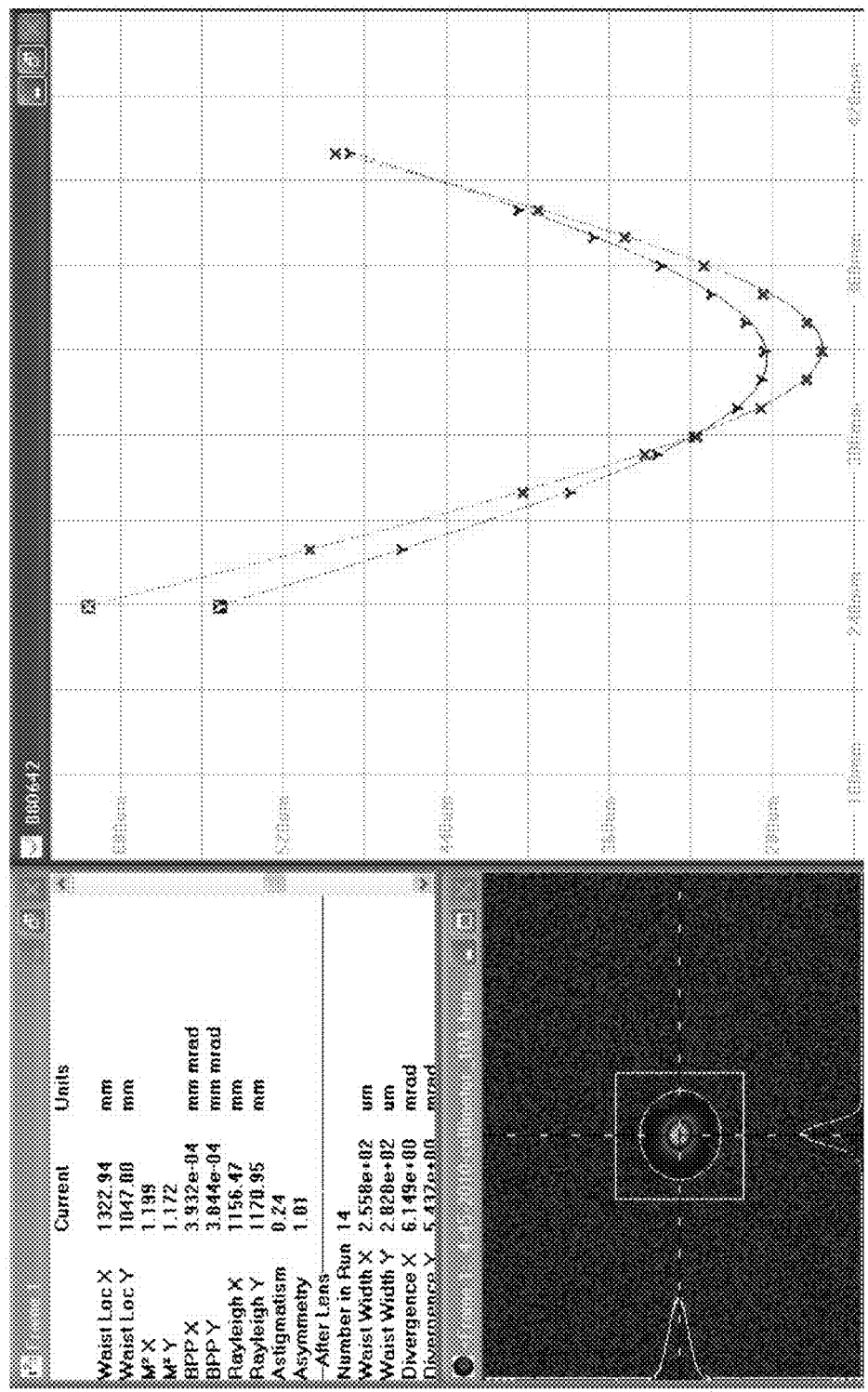
FIGS. 4, 5, 6 and 7 show results of the high-quality, low noise chirped pulse amplifier system shown in FIGS. 1B-1D and 2C.
Figure 5:
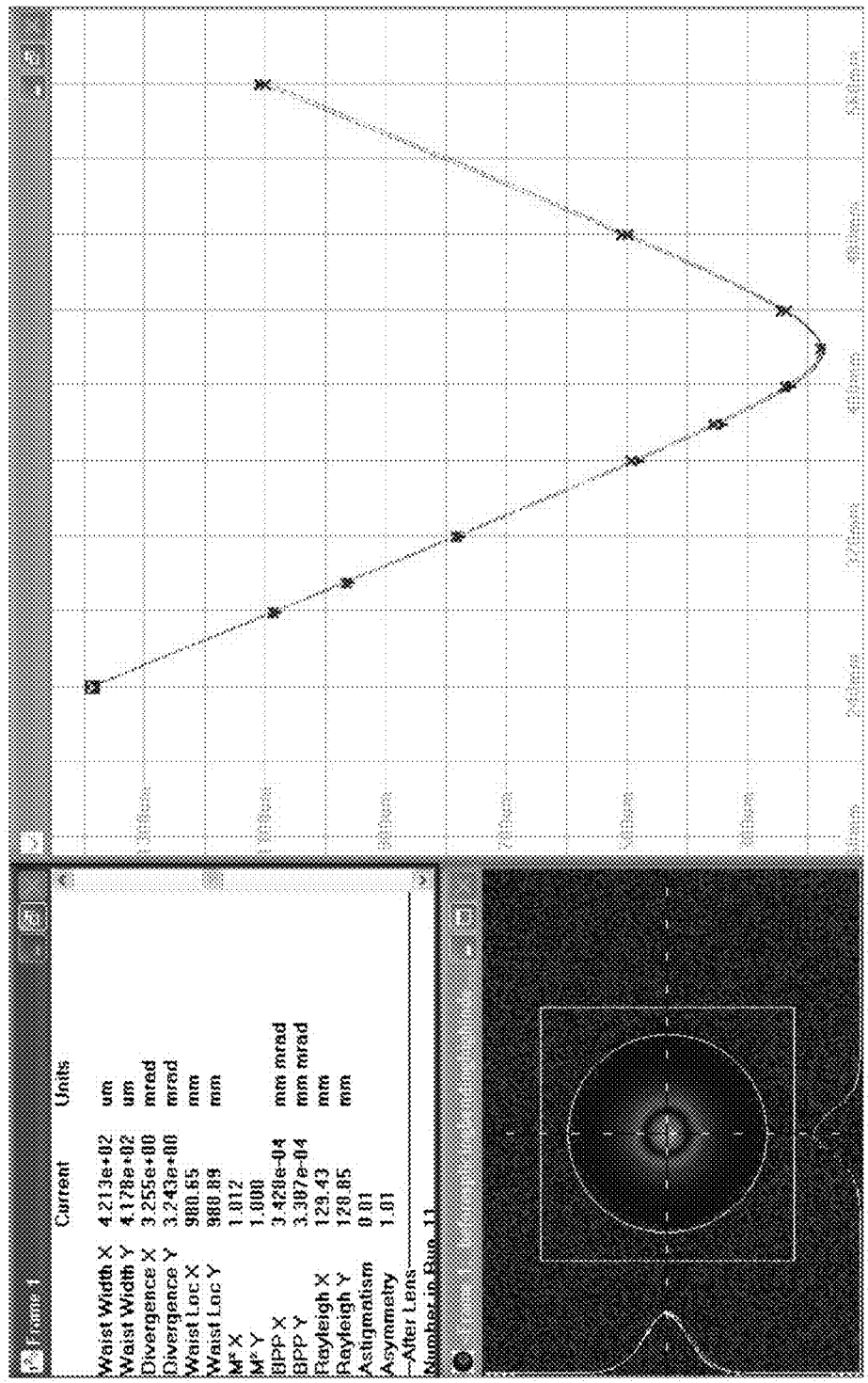
Figure 6:
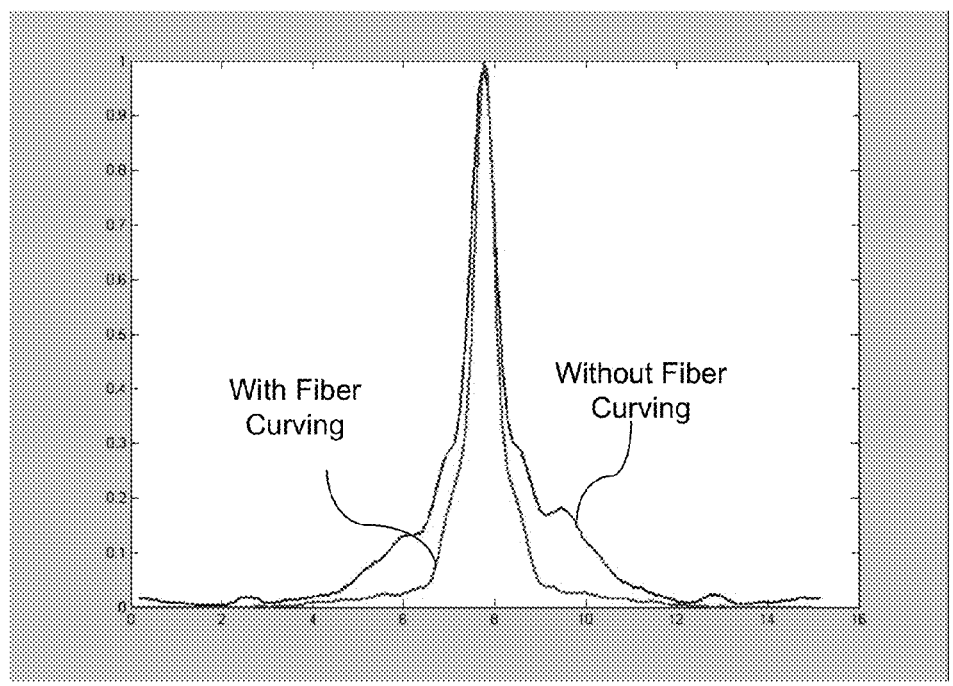

FIGS. 4, 5, 6 show results of measurements of a pulsed fiber laser device 200 shown in FIG. 2D. Significant improvement in both beam and pulse quality was achieved after applying the fiber curving technique in FIG. 2D.

FIG. 4 shows the amplifier beam quality in the amplifier in FIG. 2D without the curving where the beam quality $M^2$ along x and y directions are 1.19 and 1.17, respectively. FIG. 5 shows the amplifier beam quality in the amplifier in FIG. 2D with the proper curving in both passive and active LMA fibers where the beam quality M2 along x and y directions are 1.01 and 1.00, respectively. Significant improvement in beam quality is achieved by the fiber curving.

FIG. 6 compares the final compressed pulse quality with and without fiber curving, where the improvement of pulse quality is evident.

Figure 7:
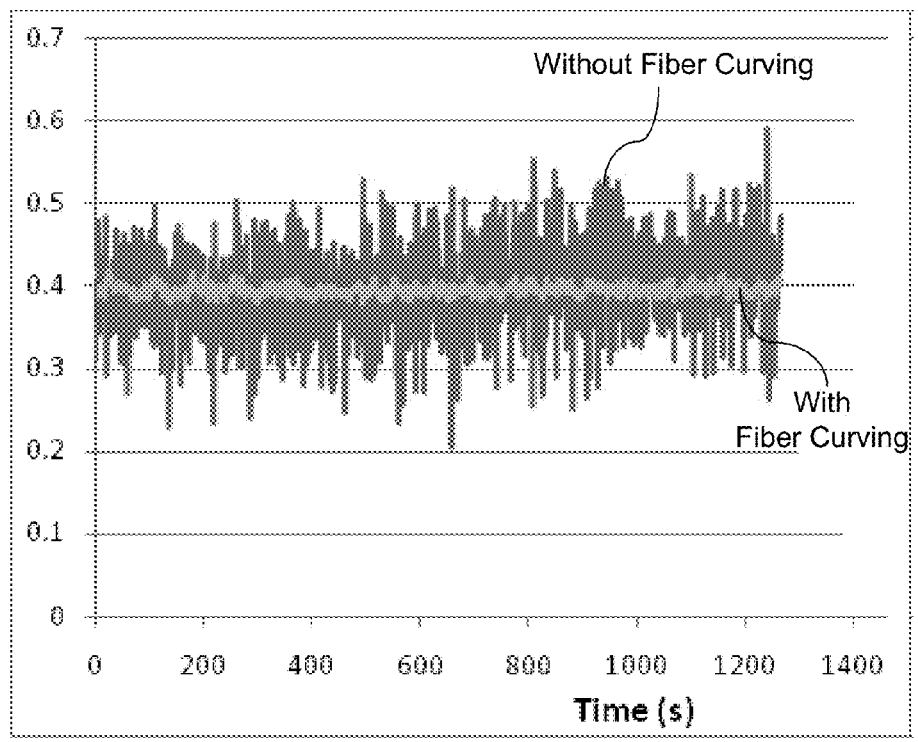

FIG. 7 compares the measured equivalent peak power variations of the final compressed pulse with fiber curving (center trace) and without fiber curving. The results clearly indicate that without fiber curving, the random mode coupling introduces large fluctuations on the pulse peak power; while the peak power fluctuates much less when the proper fiber curving in FIG. 2D was implemented.

Figure 2E:
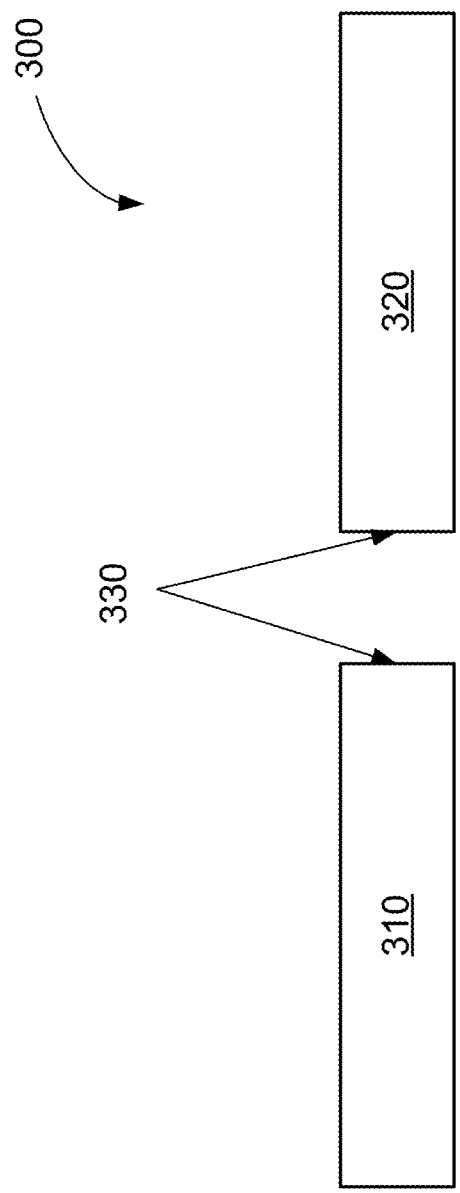
FIG. 2E shows another exemplified implementation of the HOM mixing suppressor in FIGS. 1A-1C.

In some embodiments, referring to FIG. 2E, HOM mixing suppressors 152, 154, 182 (FIG. 1B-1E) can be implemented by an HOM mixing suppressor 300 that reduces intermodal mixing at adjoining of fiber end surfaces 330 of two LMA fibers 310, 320. The LMA fiber 310 can be a passive LMA fiber, in which mode conversion and pump delivery is typically done in passive fiber for maximum efficiency, lower manufacturing cost, and a high flexibility. The LMA fiber 320 can be an active LMA fiber, in which doped active ion in the glass host is optimized for maximum gain, maximum output power, maximum efficiency as well as lower HOM and low intermodal mixing of HOM.

Fiber fusion splicer is a robust and reliable method to adjoin two sections of fibers. Current fiber fusion splicer has been perfected for the optical fiber communications where single mode communication fiber fusion splicing has been reliable, low cost and low loss. However, for LMA fiber, the current fiber fusion splicing techniques cannot adequately address the issue of HOM mixing and excitation in LMA fiber. For a typical LMA fiber with core diameter of 25 um, NA=0.07, the HOM mixing at a typical good splicing point is about 2%-5%. The current standard procedure to prepare the fiber prior to splicing involves striping the coating of the fiber, end surface cleaving, and two fiber core alignment and fusion. The state of the art fiber fusion splicing techniques is based on fiber cleaving with cleave angles (orientation of the fiber end surface relative to the plane normal to fiber axis) typically 0.3 degree off normal and the fiber core alignment typical 1-3 μm off ideal due to core concentricity of the LMA and splicer alignment, which result in significant HOM mixing at splicing point. In the present invention, the angles of fiber end surfaces 330 from the plane normal to fiber axis have been reduced to less than 0.1 degree by surface polishing. During polishing, an interferometric angular measurement system can be employed to measure the polishing angle of the end surfaces 330, which assures flatness of the end surfaces 330 and the polishing angles to be below 0.1 degree. The end surfaces 330 are fused to splice the two LMA fibers 310, 320. HOM mixing is suppressed to below 5% or below 1% at the interface formed by the end surfaces 330.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

Only a few examples and implementations are described. Other implementations, variations, modifications and enhancements to the described examples and implementations may be made.

What is claimed is:

1. A fiber laser device for generating laser pulses, comprising:
   a pulsed seed laser configured to produce laser pulses;
   one or more high-order-mode (HOM) mixing suppressors each configured to suppress HOM mixing in the laser pulses;
   an optical pulse stretcher configured to stretch durations and decrease peak power of the laser pulses;
   an active large-mode-area fiber configured to amplify the laser pulses to produce amplified laser pulses; and
   an optical pulse compressor configured to receive the amplified laser pulses from the active large-mode-area fiber and to shorten the durations and increase the peak power of the amplified laser pulses.

2. The fiber laser device of claim 1, wherein at least one of the one or more HOM mixing suppressors is configured to suppress HOM mixing to below 5%.

3. The fiber laser device of claim 1, wherein at least one of the one or more HOM mixing suppressors comprises a passive large-mode-area fiber structured to support a first fundamental fiber mode and first higher order fiber modes, wherein the passive large-mode-area fiber comprises a first curved portion defined by a first radius of curvature not larger than 10 cm, wherein the first curved portion is configured to suppress the mixing of first higher order modes and to allow the laser pulses to transmit through the one or more passive large-mode-area fibers in the first fundamental fiber mode.

4. The fiber laser device of claim 3, wherein the first radius of curvature is 5 cm or smaller.

5. The fiber laser device of claim 3, wherein the first curved portion spans an angular range of at least 45 degree.

6. The fiber laser device of claim 3, wherein the first curved portion in the passive large-mode-area fiber is in the form of a circle, a serpentine shape, or the shape of the Arabic number "8".

7. The fiber laser device of claim 3, wherein the passive large-mode-area fiber is coiled in one or more circles which includes the first curved portion.

8. The fiber laser device of claim 3, wherein the one or more HOM mixing suppressors comprise a first passive large-mode-area fiber coupled between the pulsed seed laser and the optical pulse stretcher.

9. The fiber laser device of claim 8, wherein the one or more HOM mixing suppressors comprise a second passive large-mode-area fiber coupled between the optical pulse stretcher and the active large-mode-area fiber, wherein the active large-mode-area fiber is configured to receive the laser pulses from the second passive large-mode-area fiber.

10. The fiber laser device of claim 3, wherein the one or more passive large-mode-area fibers comprises a first passive large-mode-area fiber coupled between the optical pulse stretcher and the active large-mode-area fiber, wherein the active large-mode-area fiber is configured to receive the laser pulses from the first passive large-mode-area fiber.

11. The fiber laser device of claim 3, wherein the active large-mode-area fiber is structured to support a second fundamental second fiber mode and second higher order fiber modes, wherein the active large-mode-area fiber comprises a second curved portion that is configured to suppress the mixing of second higher order modes in the active large-mode-area fiber and to allow the amplified laser pulses to transmit through the active large-mode-area fiber in the second fundamental fiber mode.

12. The fiber laser device of claim 1, wherein at least one of the one or more HOM mixing suppressors comprises a passive large-mode-area fiber which comprises:

a region doped with an absorptive dopant that is configured to selectively attenuate HOM in the passive large-mode-area fiber.

13. The fiber laser device of claim 1, further comprising:
a pump laser configured to produce pump light to optically amplify the laser pulses in the active large-mode-area fiber; and
an optical combiner coupled with the pump laser and the seed laser, wherein the optical combiner is configured to combine the pump light from the pump laser with the laser pulses from the pulsed seed laser and input into the one or more HOM mixing suppressors.

14. A fiber laser device for generating laser pulses, comprising:
a pulsed seed laser configured to produce laser pulses;
a high-order-mode (HOM) mixing suppressor comprising a passive large-mode-area (LMA) fiber configured to transmit the laser pulses in a fundamental fiber mode and higher order fiber modes in the laser pulses, wherein the passive LMA fiber comprises a first end surface oriented less than 0.1 degree relative to a normal plane of an axis of the passive LMA fiber, wherein the passive LMA fiber is configured to suppress HOM mixing in the laser pulses; and
an active large-mode-area fiber configured to amplify the laser pulses to produce amplified laser pulses, wherein the active LMA fiber comprises a second end surface oriented less than 0.1 degree relative to a normal plane of an axis of the active LMA fiber,
wherein the first end surface of the passive LMA fiber and the second end surface of the active LMA fiber are fused to splice the passive LMA fiber and the active LMA fiber.

15. The fiber laser device of claim 14, wherein the passive large-mode-area fiber comprises a curved portion defined by a radius of curvature not larger than 10 cm, wherein the curved portion is configured to suppress mixing of the higher order modes and to allow the CW laser beam to transmit through the one or more passive large-mode-area fibers in the fundamental fiber mode.

16. The fiber laser device of claim 15, wherein the radius of curvature is 5 cm or smaller.

17. The fiber laser device of claim 15, wherein the curved portion spans an angular range of at least 45 degree.

18. The fiber laser device of claim 14, wherein the passive LMA fiber comprises:
a region doped with an absorptive dopant that is configured to selectively attenuate HOM in the passive large-mode-area fiber.

19. The fiber laser device of claim 14, wherein the HOM mixing suppressor is configured to suppress the HOM mixing to below 5%.

20. The fiber laser device of claim 14, wherein the passive LMA fiber and the active LMA fiber are so configured such that HOM mixing in the laser pulses is suppressed to below 5% at an interface of the first end surface and the second end surface.

\* \* \* \* \*